W. D. M. HOWARD.
AUTOMATIC GEARLESS POWER TRANSMISSION.
APPLICATION FILED APR. 4, 1917.
1,269,935.
Patented June 18, 1918.
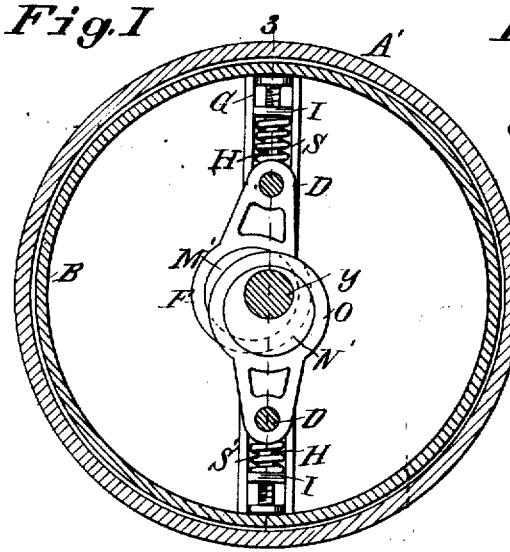
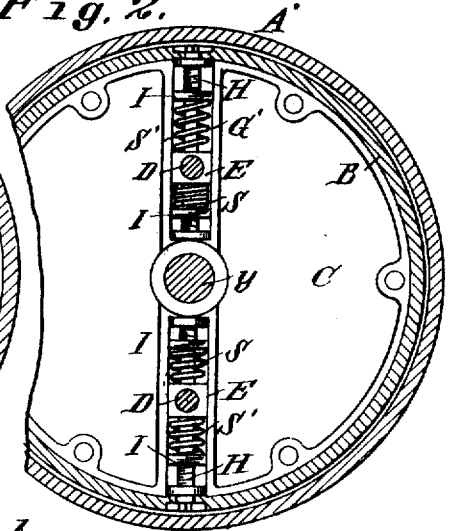
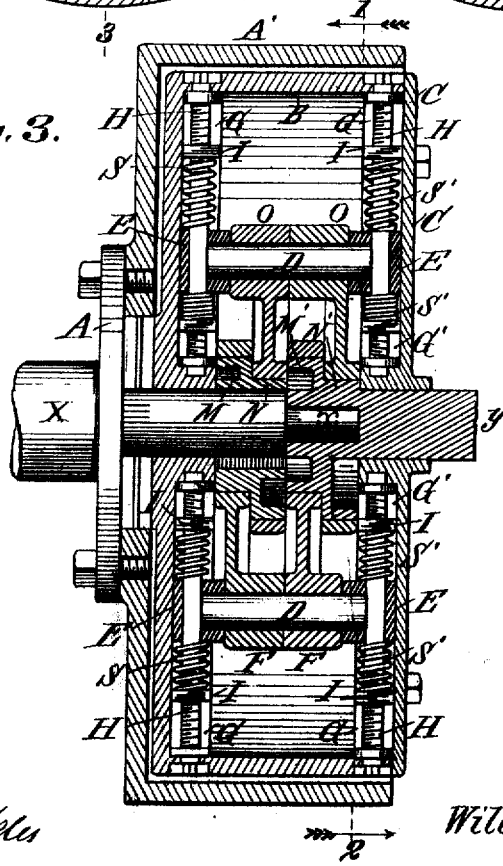
WITNESSES:
INVENTOR
William D. M. Howard
BY Strong & Townsend
ATTORNEYS

UNITED STATES PATENT OFFICE.

WILLIAM D. M. HOWARD, OF SAN FRANCISCO, CALIFORNIA, ASSIGNOR OF ONE-HALF TO HARRY LEAP, OF CAMP MEEKER, CALIFORNIA.

AUTOMATIC GEARLESS POWER TRANSMISSION.

1,269,935.     Specification of Letters Patent.     Patented June 18, 1918.

Application filed April 4, 1917. Serial No. 159,616.

*To all whom it may concern:*

Be it known that I, WILLIAM D. M. HOWARD, a citizen of the United States, residing at the city and county of San Francisco and State of California, have invented new and useful Improvements in Automatic Gearless Power Transmissions, of which the following is a specification.

This invention relates to a mechanical apparatus for transmitting power at variable speeds and turning torque, the speed and power derived varying automatically with the change of the load. It provides for a self-compensating mechanism operating at different speeds, depending on the difference of turning torque between the drive and the driven shafts as the load varies, and enables the speed of the driving shaft and power output to remain constant in the application of power.

The invention consists in the combination with a driving and driven shaft, having a common axis, of eccentrics fixed to the driving shaft and eccentric straps connecting said eccentrics with transverse pins, which pins have free radial motion in guideways of the transmission case, and acting, in conjunction with springs as the load varies, to vary the speed.

It also comprises details of construction which will be more fully explained by reference to the accompanying drawings, in which—

Figure 1 is a section through the line 1—1 of Fig. 3, looking to the left.

Fig. 2 is a section on line 2—2 of Fig. 3, looking toward the right.

Fig. 3 is a section through line 3—3 of Fig. 1.

In engines or motors applied where variable speeds and power are required, as is well illustrated in the operation of automobiles, it has been found necessary, where internal combustion engines furnish the power, to interpose between the engine and the load various mechanical means for reducing the speed of rotation and increasing the power or turning torque, such as gear shifts, in various combinations. These devices must be operated by an external agency, introducing the personal equation, and by their inherent mechanical design and functions they are measurably inefficient.

My invention automatically operates itself, tending to bring about a constant balance between the engine power and the load torque, by reducing the speed and increasing the pull of the driven shaft in the same ratio as the load increases, while the prime mover has a constant speed and power.

As shown in the accompanying drawings, X is the engine crank shaft, having fixed to and turnable with it a flange A, and A' is a fly-wheel which is bolted to the flange and rotates with it. This fly-wheel is here shown as being cup-shaped in form and inclosing within it the remaining mechanism of the apparatus. Y is the shaft to be driven, and through which motion and power are applied. This shaft is axially in line with the shaft X and the meeting ends of these two shafts may be steadied by means of a pin $x$ extending axially from one into the other.

B is a cylindrical transmission case which is free to revolve around the axis of the crank shaft X and the driven shaft Y and containing the mechanism to be hereinafter described. This case is turnable freely about the shafts X and Y and has radial slots, as at G.

C is the cover or outer end of the case B and through this end also are made radial slots G'. M and N are twin eccentrics, the major axes of which are set at 90° apart and they are keyed to the power shaft X so as to be rotated with it. M' and N' are duplicate eccentrics keyed to the driven shaft Y. The eccentric straps F and O are disposed in pairs upon these eccentrics, and the straps extend toward the periphery of the transmission case and are there connected with shafts D which extend through them, and the ends turn in bearing blocks E, which are free to slide in the radial slots or channels G—G'.

The shafts D connect the eccentric straps F and O alternately in pairs and the straps are free to turn upon these shafts. H are shafts located radially in the radial slots G—G' and having right and left-handed threads at their inner and outer ends and with compression blocks I movable upon them. Between these compression blocks and the bearing blocks E of the shafts D are fitted compression springs S and S', the tension of which may be altered by turning the screws to advance the blocks I and vary the spring pressure upon the bearing blocks E.

The device operates as follows: Suppose the crank shaft X, with its flange and flywheel, to be revolving in a clockwise direction at a given speed, the eccentries M and M', being keyed thereto, will also revolve and tend to rotate within their respective eccentric straps. The case B in revolving, and the movement of the eccentric straps, applied to the pin shafts D and the bearing blocks E, would cause the latter to slide radially out and in, in the channels in which they fit, with a reciprocating motion. The inertia of the driven shaft, on account of its load, or for other reason resisting the tendency to turn, produces a pull or force on its eccentric straps in the opposite direction to that exerted by the straps M and M' first named. Motion is thus transmitted from the eccentrics through the shafts D and the blocks E to revolve the case B. So long as the turning torque of the driven shaft is not greater than that of the power or crank shaft X, the whole device revolves as a unit with the fly-wheel A' and at a constant speed.

If the load on the driven shaft should exceed the power torque of the crank shaft X, the force on the alternate eccentric straps will become unbalanced and the shaft D will be caused to reciprocate in the radial bearing slots H, and the speed of revolution of the case B will be reduced proportionally until the opposing forces attain an equilibrium, it being obvious that there will be no lost motion or slippage.

When the device becomes out of equilibrium, because of an increase of load on the driven shaft Y, above the power of the crank shaft X, it automatically changes the speed of rotation and causes the shaft D and its bearings E to slide radially, thus giving a greater turning torque to the shaft Y and lowering its speed of rotation.

In order to increase the starting torque of the device, tension springs S' are placed between the bronze bearing blocks E and the compression blocks I. By turning the threaded shaft H the compression on these springs may be increased or diminished at will. The increasing compression produces an additional compression on the block which tends to revolve the case B at a greater speed of rotation for a given load, before the blocks begin to slide in the channels G, thereby reducing the speed of rotation of the case B and the driven shaft Y.

By this construction the casing is positively driven by the drive member, the driven member is positively driven by the casing when the inertia of the load on the driven member does not exceed the power of the drive member. Under this condition the entire mechanism operates as a unit at constant speed. Should the inertia of the load on the driven member exceed the power of the drive member the momentum of the revolving casing which drives the driven member will be reduced and a portion of the speed of rotation of the case will automatically be transformed into radial motion of the shafts D. Thus the power torque will always equal the load torque plus the speed, and a constant positive transmission of power between the driven and drive members at variable relative speeds with increased turning torque on the driven member in the same ratio as its speed decreases will be the compensating resultant of the forces actuating the mechanism.

This operation is brought about because of the momentum stored in the revolving member plus the artificial resistance of the springs which tend to prevent the transverse pins from radial motion.

It is obvious that if an amount of force equal to one horse-power be delivered to the shaft X to rotate the same, the shaft Y under normal loads will rotate at the same speed as the shaft X and deliver one horsepower. The radial pins not being able to compress the tension springs at their ends have no radial motion. Under this condition the whole mechanism revolves as a unit and may be said to be on direct drive.

If however, a load greater than normal, for which the tension of the springs is set, be imposed upon the driven shaft Y a new resolution of forces in the device brought about by the reciprocation of the aforesaid pins in a radial direction, permitting the mechanism to revolve at normal speed and allowing the driven shaft Y to be carried around at a slower speed than the speed of rotation of the drive shaft X. It must be obvious that, allowing for friction in the device, if one horse-power is applied to the shaft X and the load on the driven shaft be increased to double the normal load and the speed of rotation of the driven shaft Y decreases to one-half its normal speed, it will have double the turning torque of the drive shaft X minus the internal friction of the device itself.

It is not contended that at any time under any conditions of operation are we able to derive an equal power from the driven shaft Y as that which is applied to the drive shaft X, but I am enabled to utilize the power applied to the drive shaft X by taking it from the driven shaft Y, the driven shaft Y revolving at lower speed than the drive shaft X and increasing the turning torque at the same ratio as its decrease in speed.

Having thus described my invention, what I claim and desire to secure by Letters Patent is—

1. A power transmission device including a driving and a driven shaft axially in line, a transmission case with radially slotted ends, within which case the abutting shaft ends meet and are revoluble, eccentrics fixed to the driving shaft, similar pairs of eccentrics secured to the driven shaft, short pin shafts extending across the case into the slots, compression springs within the slots pressing upon the said pins, and straps connecting the eccentrics with the radially movable pins.

2. A power transmission device consisting of a transmission case having radially slotted ends, a driving and a driven shaft meeting axially within the case and freely and independently turnable therethrough, short transverse pins extending into the radial slots with boxes slidable in the slots, and compression springs upon either side, eccentrics fixed at right angles upon the driving shaft, and other eccentrics upon the driven shaft, and straps surrounding the eccentrics and having their ends connected with the radially movable pins.

3. A means for transmitting power from a prime mover having constant speed, power and turning torque, to a variable load in a flexible manner, said means including a prime mover shaft and a load shaft journaled in an axial line, a pair of eccentrics fixed to the contiguous ends of each of said shafts, a case having radially slotted ends, pin shafts with boxes guided in the radial slots, eccentric straps connecting the eccentrics with said pin shafts, and compression springs acting upon the pin shaft boxes.

4. In a mechanism of the character described for the positive transmission of power comprising a drive member, a driven member and connecting mechanical means for positively transmitting power and positively changing the relative speeds and turning torques; the drive member having attached thereto and operating therewith twin eccentric blocks with their major axes set at an angle of 90° or 180°, the driven shaft carrying members having eccentricity with their major axes as aforesaid, said eccentrics being alternately connected to slidable shafts by straps, said slidable shafts moving in radial slots or bearings set at an angle of 90° or 180° respectively, said slots being a co-ordinate part of a casing which is free to revolve around said drive and driven shafts.

In testimony whereof I have hereunto set my hand in the presence of two subscribing witnesses.

WILLIAM D. M. HOWARD.

Witnesses:
 JOHN H. HERRING,
 W. W. HEALEY.